(12) United States Patent
Cross

(10) Patent No.: US 6,810,422 B1
(45) Date of Patent: Oct. 26, 2004

(54) SYSTEM AND METHOD FOR PROBABILISTIC QUALITY OF COMMUNICATION SERVICE DETERMINATION

(75) Inventor: Joseph K. Cross, Edina, MN (US)

(73) Assignee: Lockheed Martin Tactical Defense Systems, Eagan, MN (US)

( * ) Notice: Subject to any disclaimer, the term of this patent is extended or adjusted under 35 U.S.C. 154(b) by 0 days.

(21) Appl. No.: 09/483,155

(22) Filed: Jan. 14, 2000

(51) Int. Cl.[7] ............................................. G06F 13/00
(52) U.S. Cl. .................. 709/227; 370/395.21; 370/230
(58) Field of Search ............................. 709/200–203, 709/225–229; 718/104, 106; 370/401, 229–235, 395.2, 395.21

(56) References Cited

U.S. PATENT DOCUMENTS

| | | | |
|---|---|---|---|
| 4,336,612 A | 6/1982 | Inoue et al. ................... | 371/39 |
| 4,665,533 A | 5/1987 | Tomikawa ................... | 375/106 |
| 4,821,034 A | 4/1989 | Anderson et al. ......... | 340/825.8 |
| 4,961,224 A | 10/1990 | Yung ........................... | 380/25 |
| 5,136,581 A | 8/1992 | Muehrcke .................... | 370/62 |
| 5,168,495 A | 12/1992 | Smith ......................... | 370/85.6 |
| 5,208,659 A | 5/1993 | Rhodes ......................... | 358/12 |
| 5,233,604 A | 8/1993 | Ahmadi et al. ............... | 370/60 |
| 5,239,476 A | 8/1993 | James et al. ........... | 364/474.01 |
| 5,311,461 A | 5/1994 | Gallagher ................... | 395/650 |
| 5,394,408 A | 2/1995 | Nishihara et al. .......... | 371/57.2 |
| 5,406,476 A | 4/1995 | Deziel, Jr. et al. .......... | 364/402 |
| 5,408,465 A | 4/1995 | Gusella et al. ................ | 370/17 |
| 5,428,789 A | 6/1995 | Waldron, III ............... | 395/700 |
| 5,430,848 A | 7/1995 | Waggener .................... | 395/325 |
| 5,432,790 A | 7/1995 | Hluchyj et al. ............ | 370/95.1 |
| 5,432,920 A | 7/1995 | Yazawa et al. ............. | 395/425 |
| 5,432,939 A | 7/1995 | Blackledge, Jr. et al. ... | 395/700 |
| 5,446,730 A | 8/1995 | Lee et al. ..................... | 370/54 |
| 5,467,343 A | 11/1995 | Lee et al. ..................... | 370/54 |
| 5,479,404 A | 12/1995 | Francois et al. .............. | 370/84 |
| 5,485,455 A | 1/1996 | Dobbins et al. .............. | 370/60 |
| 5,487,061 A | 1/1996 | Bray ............................ | 370/13 |
| 5,490,141 A | 2/1996 | Lai et al. .................... | 370/60.1 |
| 5,506,972 A | 4/1996 | Heath et al. ................. | 395/293 |
| 5,517,643 A | 5/1996 | Davy ........................... | 395/650 |
| 5,519,689 A | 5/1996 | Kim ............................ | 370/17 |
| 5,524,247 A | 6/1996 | Mizuno ...................... | 395/726 |
| 5,526,496 A | 6/1996 | Alnuweiri ................... | 395/305 |
| 5,530,860 A | 6/1996 | Matsuura .................... | 395/650 |
| 5,537,408 A | 7/1996 | Branstad et al. ............. | 370/79 |
| 5,548,579 A | 8/1996 | Lebrun et al. ................ | 370/16 |

(List continued on next page.)

Primary Examiner—St. John Courtenay, III
(74) Attorney, Agent, or Firm—Nikolai & Mersereau, P.A.

(57) ABSTRACT

This invention relates generally to multiple systems capable of linking between systems, wherein one system may provide services to another linked system. More particularly, the present invention relates to an establishment or termination of a link between systems dependant upon whether a predefined minimum level of quality of service can be provided by one system to the other linked system. Without limitation, the application software of a first system may be linked to an interface of a second system, wherein the link between the application software and interface is established if the interface is capable of providing a minimum quality of service defined by the application software.

37 Claims, 5 Drawing Sheets

U.S. PATENT DOCUMENTS

| | | | |
|---|---|---|---|
| 5,568,468 A | 10/1996 | Ogasawara et al. | 370/13 |
| 5,574,934 A | 11/1996 | Mirashrafi et al. | 395/800 |
| 5,581,544 A | 12/1996 | Hamada et al. | 370/253 |
| 5,581,703 A | 12/1996 | Baugher et al. | 395/200.06 |
| 5,583,857 A | 12/1996 | Soumiya et al. | 370/233 |
| 5,587,922 A | 12/1996 | Hendrickson et al. | 364/489 |
| 5,617,545 A | 4/1997 | Ogata et al. | 395/296 |
| 5,619,647 A | 4/1997 | Jardine | 395/200.01 |
| 5,623,603 A | 4/1997 | Jiang et al. | 395/200.04 |
| 5,630,076 A | 5/1997 | Saulpaugh et al. | 395/284 |
| 5,636,333 A | 6/1997 | Davidson, Jr. et al. | 395/114 |
| 5,640,444 A | 6/1997 | O'Sullivan | 379/59 |
| 5,644,715 A * | 7/1997 | Baugher | 709/228 |
| 5,652,749 A | 7/1997 | Davenport et al. | 370/466 |
| 5,659,691 A | 8/1997 | Durward et al. | 395/329 |
| 5,671,361 A | 9/1997 | Brown et al. | 395/209 |
| 5,680,538 A | 10/1997 | Jones et al. | 395/182.03 |
| 5,701,465 A | 12/1997 | Baugher et al. | 395/610 |
| 5,706,280 A | 1/1998 | Kosugi et al. | 370/244 |
| 5,713,043 A | 1/1998 | Baugher et al. | 395/806 |
| 5,721,732 A | 2/1998 | Emeott et al. | 370/437 |
| 5,721,735 A | 2/1998 | Smiroldo | 370/442 |
| 5,734,592 A | 3/1998 | Cox et al. | 364/554 |
| 5,751,962 A | 5/1998 | Fanshier et al. | 395/200.53 |
| 5,752,023 A | 5/1998 | Choucri et al. | 395/610 |
| 5,764,740 A | 6/1998 | Holender | 379/112 |
| 5,794,224 A | 8/1998 | Yufik | 706/14 |
| 5,809,268 A | 9/1998 | Chan | 395/376 |
| 5,872,918 A | 2/1999 | Malomsoky et al. | 395/200.5 |
| 5,873,092 A | 2/1999 | Cheng et al. | 707/103 |
| 5,883,819 A | 3/1999 | Abu-Amara et al. | 364/578 |
| 5,898,668 A | 4/1999 | Shaffer | 370/230 |
| 5,898,673 A | 4/1999 | Riggan et al. | 370/237 |
| 5,918,049 A | 6/1999 | Syväniemi | 395/674 |
| 5,918,051 A | 6/1999 | Savitzky et al. | 395/683 |
| 5,918,200 A | 6/1999 | Tsutsui et al. | 702/180 |
| 5,920,719 A | 7/1999 | Sutton et al. | 395/704 |
| 5,920,870 A | 7/1999 | Briscoe et al. | 707/103 |
| 6,104,699 A | 8/2000 | Holender et al. | 370/235 |
| 6,104,700 A | 8/2000 | Haddock et al. | 370/235 |
| 6,154,778 A * | 11/2000 | Koistinen et al. | 709/228 |
| 6,640,248 B1 * | 10/2003 | Jorgensen | 709/226 |
| 6,691,148 B1 * | 2/2004 | Zinky et al. | 709/201 |

* cited by examiner

SYSTEM AND METHOD FOR PROBABILISTIC QUALITY OF COMMUNICATION SERVICE DETERMINATION

FIELD OF THE INVENTION

This invention relates generally to multiple devices having systems capable of linking between other device systems, wherein a first system may provide services to a second linked system. More particularly, the present invention relates to devices capable of establishing or terminating a link between first and second systems dependant upon whether a predefined minimum level of quality of service can be provided by the first system to the second linked system. The predefined minimum level of quality of service is defined by the second system, wherein the definition is independent of the system requirements or hardware configuration of the first system.

BACKGROUND OF THE INVENTION

Over the years, the ability of multiple devices having computer based control systems to, for example, "communicate" with one another has become increasingly important both economically and otherwise. This communication between devices requires transmitting information from one device to another. The quality of the communication transfer or transmission may be characterized by several factors including the latency (the time between the transmission of the information and its reception), reliability (the proportion of transmitted messages that are received) and security (freedom from interception, destruction, or intentional alteration by a third party). Each of these variables may be critical to an adequate communication between the devices depending upon the type of communication being transmitted. For example, latency is critical to video conferencing, reliability is critical in aircraft avionics and security is critical in electronic banking.

At times, the transmitting device may require a "guarantee" that a communication mechanism with the receiving device can provide a minimum quality of communication service before transmitting or communicating information to the receiving device. In the past, inherent in the definition of quality of service has been a recognition that the quality of communication service will be limited by the system constraints or hardware configuration of the receiving device. When the system or hardware of the communication mechanism is upgraded, the transmitting device or at least the definition of the quality of communication service may also need to be upgraded in order to continue communication with the receiving device via the upgraded mechanism or to utilize the improvements to the communication mechanism. Hence, although a communication mechanism's system constraints or hardware configuration may potentially affect the quality of communication service, it is desirable that the minimum threshold of quality of communication service with the receiving device be defined independent of the communication mechanism's system constraints or hardware configuration.

The quality of communication service between the receiving device and transmitting device may also vary depending upon the medium of transmission (e.g. radio waves, copper wire, etc.) and/or the priority given the transmission (e.g. different communications may be given different priorities thereby improving the quality of service provided to one at the expense of the other). Further, the way a particular medium is used by the communication mechanism and user may affect the quality of service (ie: having the recipient of each packet of transmitted information check for errors and return a positive or negative acknowledgement to the sender may increase reliability at a cost of increased latency). Also, routers and switches may be utilized to control the multi-functioning services of the communication mechanism to decrease latency without significant affects on reliability.

A selection of the communication mechanism at the time communication is to begin provides several benefits: the communicating systems get the qualities they require, the resources used for communication are more fully used, and new communication resources (hardware and software) can be installed/exploited without requiring changes to the system that will use those resources (ie: required changes to the application software).

In the past, quality of communication service has typically been defined by requiring one or more of the following: a specific medium, qualitative specifications and/or token-bucket specifications. A medium-specific specification is limited to one physical communication medium. For example, "OC-3" is a quality of service (in fact, a bandwidth, in bits per second) that makes sense for the SONET (Synchronous Optical Network) medium, but is meaningless in, for example, a BISDN (Broadband Integrated Services Digital Network). Thus there is a need for a device that is capable of defining quality of service independent of the medium being utilized.

Another medium-specific specification may require that the communication service be provided of the same quality that would be obtained if no other systems were using the medium. Such specifications suffer from the fact that they may become meaningless when the transmission medium is changed, and they are useless when several media are used to transmit a message.

Qualitative specifications are also limited in effectiveness. Qualitative specifications are expressed using a few terms such as "best effort" and "urgent" and may provide little assurance to the transmitting system that the subjective standard will be interpreted the same by the receiving system. Also, qualitative specifications have no verifiable semantics, and are therefore applicable only to problem domains where such vagueness and uncertainty is acceptable.

A token-bucket specification has precise semantics and is independent of any communication medium. However, token-bucket specifications are limited to a very narrow range of communication possibilities. A token-bucket is a particular form of communication traffic specification consisting of a "token rate" r and a "bucket size" b. The token-bucket specification allows several systems to be connected and communicating with a single receiving system. The r parameter specifies the continually sustainable data rate of the receiving system, while the b parameter specifies the extent to which the data rate can exceed the sustainable level for short periods of time. The communication traffic must obey the rule that over all time periods, the amount of data sent cannot exceed $rT+b$, where T is the length of the time period. Evidently, token-bucket specifications cannot allow for common traffic patterns, such as strictly periodic events, or completely random (Poisson) events.

Other past devices have defined quality of communication service and load in terms of a specific quantity or number. For example, the values of latency, inter-service time, message size, and the like have been defined as constants. In some cases this is appropriate, as when messages of a known and constant size will be sent on a rigidly periodic schedule; however, a requirement to use a constant or single value to define the quality of service has required the application defining the quality of service to use worst-case values, resulting in poor resource utilization.

Also, past communication systems have not allowed the transmitting system to adequately define its requirements for quality of communication service prior to establishing a communication link with the receiving system. The present invention meets these and other needs that will become apparent from a review of the description of the present invention.

SUMMARY OF THE INVENTION

A system for determining whether an interface is capable of fulfilling a quality of service demand of an application is provided by the device and method of the present invention. The present invention includes an interface to an application, wherein the interface is capable of linking or "negotiating" with a plurality of applications and also performing services for the applications. The initial communications or requests sent from each application to the interface include a demand specifier that defines a required quality of service to be provided by the interface. A capability of the interface to provide the required quality of service is determined upon initiating a link or negotiation between the interface and the application. Without limitation, the device and method of the present invention may find application in networked computers, telecommunication links, aerospace and other applications that include linked devices wherein one device performs a service for the other. The device and method of the present invention may be utilized but is not limited to use in networks utilizing Asynchronous Transfer Mode (ATM).

The form of the demand specifier does not depend upon system requirements or medium linking the interface and application. The demand specifier includes a probability assertion, which may express or require a predefined maximum acceptable latency between requesting a service and performance of the service, a predefined minimum reliability of the link between the interface and the applications, and/or a predefined required security of the link. The probability assertion of the demand specifier is defined by a pair of density bounds, wherein the pair of density bounds may express a predefined maximum acceptable latency between requesting a service and performance of the service, a predefined minimum reliability of the link between the interface and the applications and/or a predefined required security of the link.

In use, a demand specifier is incorporated within the application, wherein the demand specifier defines a required quality of service to be performed by an interface. An initial link or negotiation between an application and interface is undertaken. Upon initializing the negotiation or link between the application and interface, the interface determines whether it is capable of performing the required quality of service of the application as defined by the demand specifier. Significant is the fact that the demand specifier does not depend upon system requirements of the interface. The negotiation or initial link is terminated between the interface and application if the interface is not capable of performing the quality of service required by the application. If the interface is capable of meeting the demand specifier of the application, then the communication link or "contract" between the application and interface is established.

The advantages of the present invention should become readily apparent to those skilled in the art from a review of the following detailed description of the preferred embodiment especially when considered in conjunction with the claims and accompanying drawings in which like numerals in the several views refer to corresponding parts.

DESCRIPTION OF THE PREFERRED EMBODIMENT

The present invention represents broadly applicable improvements to communicating devices and defining the quality of communication between the devices. The embodiments detailed herein are intended to be taken as representative or exemplary of those in which the improvements of the invention may be incorporated and are not intended to be limiting.

In the past, the definition of the quality of communication service between a transmitting and receiving device has been limited by particular identified constraints. The present invention provides for a transmitting device that defines the quality of communication service independent of the particular system constraints or hardware configuration of the receiving device. Although the device and method of the present invention will be described in terms of communication between application software of a transmitting device and application software of a receiving device mediated through support software interfaced to each, those skilled in the art will appreciate that the present invention may be utilized in many other applications and interfaces including, for example without limitation, a communication link between networked computers, a communication link between a router and remote device, a communication link between an aircraft and ground control, etc.

Figure 1:
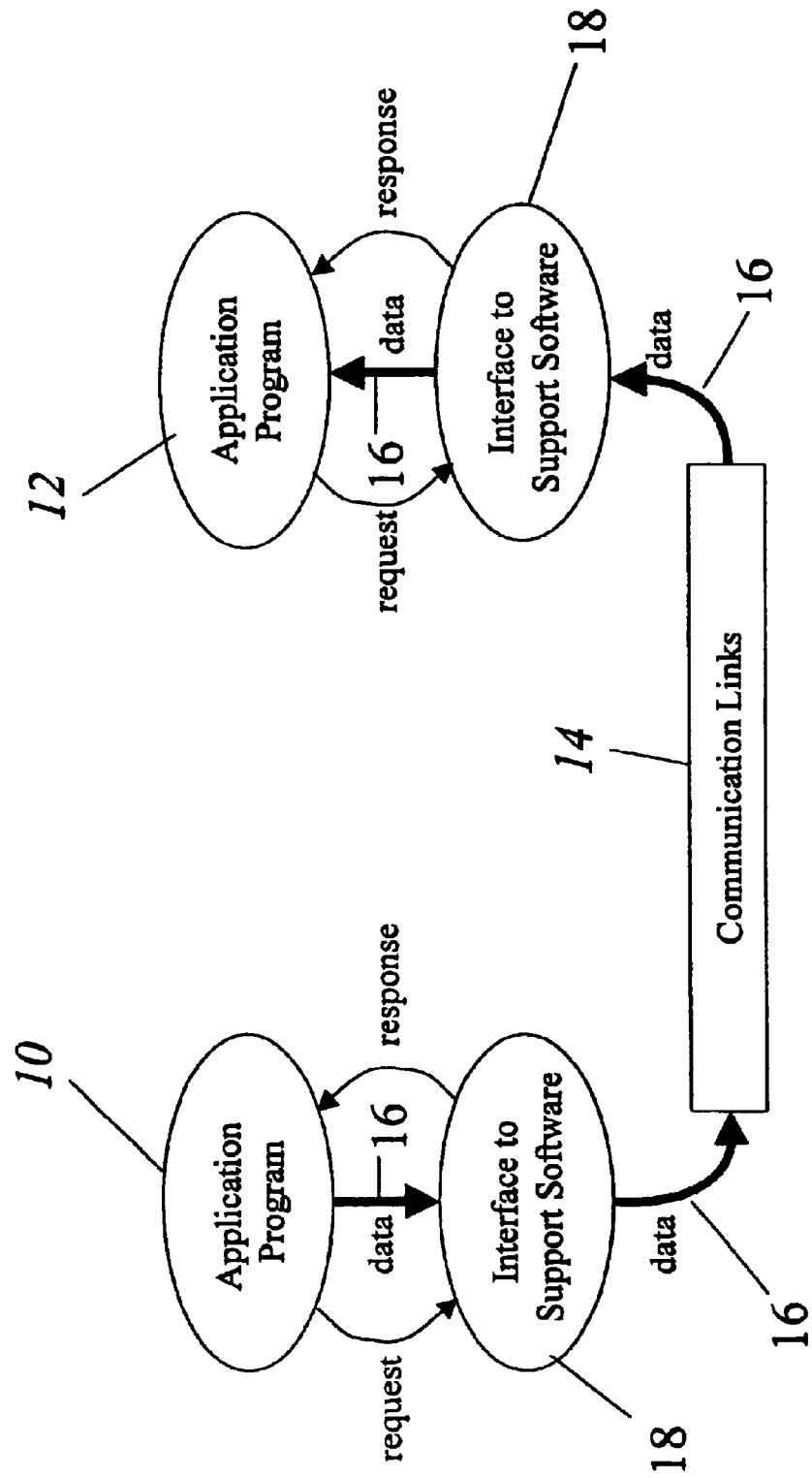
FIG. 1 is a general schematic showing the initial communication link or "negotiation" between an application system and support software interface.

The preferred embodiment includes a system of one or more applications capable of specifying to an interface the quality of service required by the application when an initial communication link or negotiation is undertaken. For illustrative purposes, FIG. 1 shows a communication link 14 between first and second application programs 10 and 12 respectively. Prior to establishing the communication link 14 wherein data 16 is transmitted from the first application program 10 to the second application program 12, each application program specifies a required quality of service to the interface 18. In addition, the sending application program 10 may specify a load that it will impose. The qualities of service and load are expressed or defined by probability assertions as described below in greater detail. The interfaces 18 then processes these requests and determines whether the interface and the underlying communication links are capable of providing the requested qualities of service under the specified load. If the interface 18 and underlying communication link 14 are capable of providing the requested qualities of service under the specified load, then the communication link (which may be likened to a contract) is established and the data 16 is transmitted from the sending application 10 to the receiving application 12. As long as the quantity and rate of transmission of the data remains within the specified load, the data will be delivered with the specified quality of service.

Figure 2:
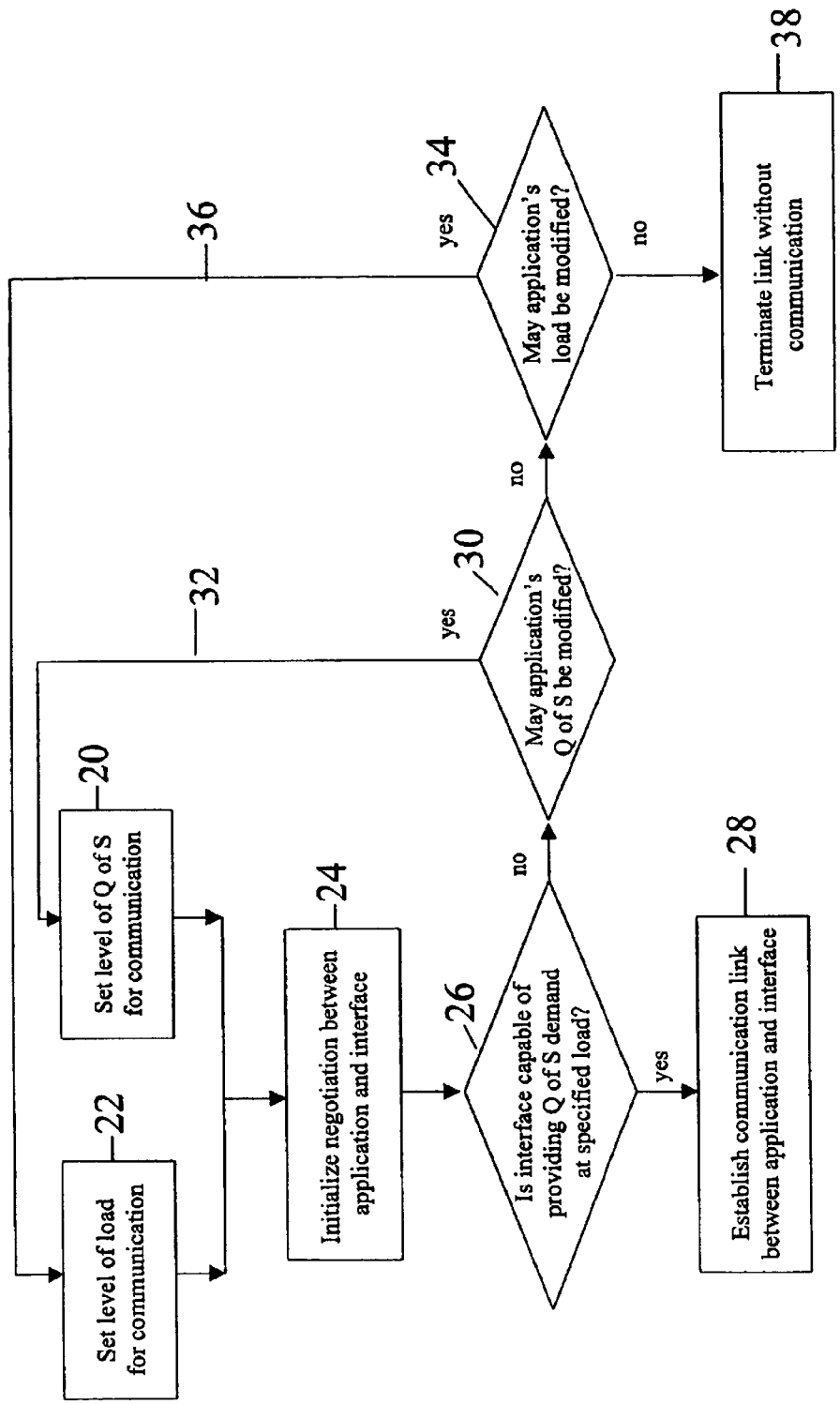
FIG. 2 is a flow diagram of a method of the present invention to determine whether a communication link should be established between a system application and supporting interface.

Those skilled in the art will appreciate that specifying the quality of service of load may be performed manually or automatically. Referring now to FIG. 2, in the preferred embodiment an author of the software of the transmitting application 10 sets or defines the minimum acceptable or desirable level of quality of service (Q of S) for the application (see block 20) and the minimum acceptable or desirable load (e.g. amount of data) that the application will transmit (see block 22). The transmitting application program then initializes a communication with the interface (likening the establishment of a link to the formation of a contract, the application program undertakes a negotiation with the interface), specifying that the service of transmitting be at a specified load of data with the specified quality of service (see block 24). The interface then determines whether, given the currently available communication links, it is possible to transmit the specified load of data with the specified quality of service (see decision block 26). If the interface is capable of providing the specified load at the specified quality of service, then a communication link between the application and interface is established (see block 28).

If the interface is not capable of providing the requested service (the quality of service demand at the specified load), then the application request is denied, and the application determines whether its Q of S demand may be reduced (see decision block 30). If the Q of S demand may be reduced then the Q of S is set at a reduced demand (likening to contract negotiations, a counteroffer is made) and the communication link is again initiated at the reduced Q of S (see loop 32). If the Q of S demand cannot be reduced then the application determines if the load can be reduced (see decision block 34). If the load is reducible, then the load is specified at a reduced load (likening to contract negotiations, a counteroffer is made) and the communication link is again initiated at the reduced specified load (see loop 36). If neither the Q of S or the load may be modified, then the link is terminated without communication (see block 38).

The receiving application 12 also conducts a "negotiation" with the interface 18 to determine whether the interface is able to meet its required quality of service. If the interface 18 is able to meet the quality of service and load specified by the transmitting application 10 and the quality of service specified by the receiving application 12, then a communication link 14 may be established between the transmitting application 10 and the receiving application 12 and data 16 may be transmitted. In this manner, communications may be established with strictly periodic or completely random transmission schedules, among others.

The demand requirements of the application are based on the observation that relevant characteristics of flows of data between computer systems are probabilistic distributions. For example, the latency of communication transmissions from one computer to another is not adequately represented by a single value, since different communications between an application and interface may require or allow different latencies. The inventor has found that communication latencies form a distribution of values. Such distribution of values can be regarded and defined as a probability distribution. As a consequence, the distribution of values such as latencies can be described by a cumulative distribution function (CDF)f(x) (see FIG. 3). The function f(x) defines a curve 34 that may define a continuous probability distribution. As the latency in time increases the proportion of messages that satisfy this required latency increase and likewise as the required latency decreases the proportion of messages that satisfy this required latency decreases.

Figure 3:
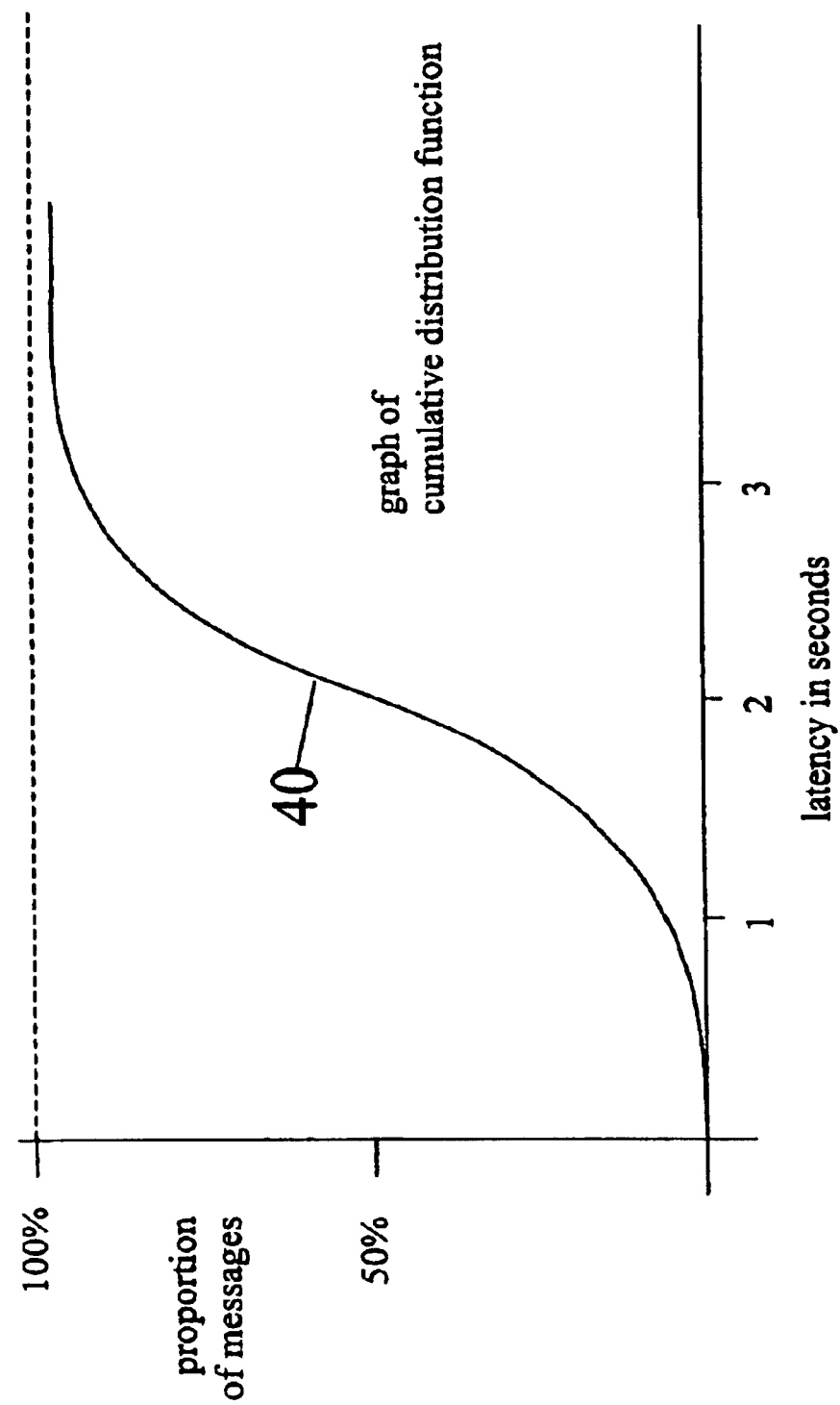
FIG. 3 is a graph of a distribution of latencies defined by its cumulative distribution function having a continuous probability assertion.

For f(x) shown in FIG. 3, about half of the messages have a latency of less than two seconds. Every distribution has a unique cumulative distribution function 40, and every cumulative distribution function corresponds to a unique distribution. It is not desirable to specify a single distribution function for most defined qualities of service. For example, it is neither feasible nor would it be desirable to require that exactly half of the delivered messages have a latency of less than two seconds. It is desirable, however, to specify a range of acceptable distribution functions.

Figure 4:
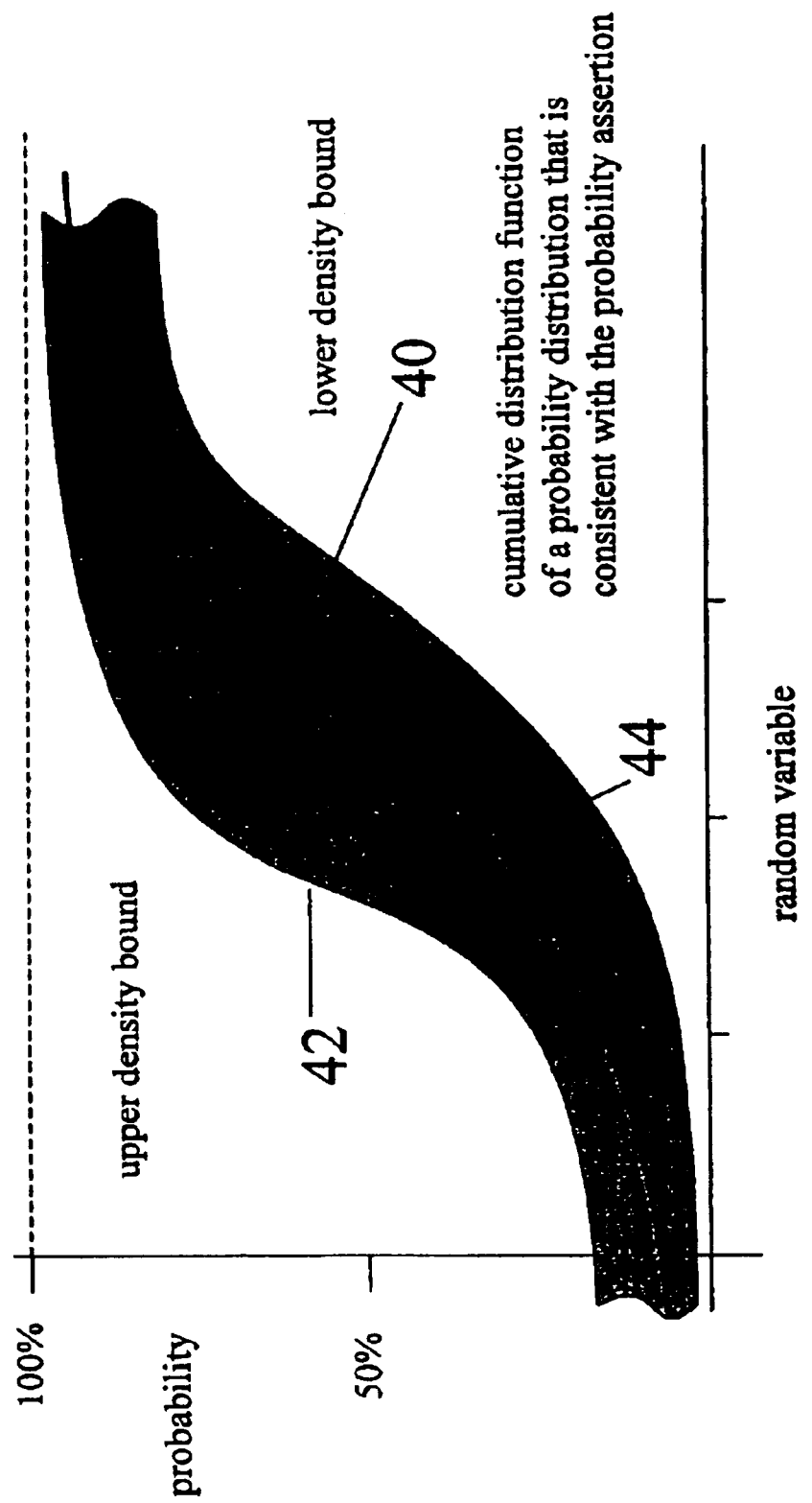
FIG. 4 is a graph of a distribution of latencies defined by its cumulative distribution function having a discrete probability assertion.

A probability assertion provides the capability of specifying a range of distribution functions and thereby specify a set of probability distributions. The probability assertion may be defined by a pair of density bounds (see FIG. 4), an upper density bound 42 and a lower density bound 44. The values of a probability assertion is the set of probability distributions whose continuous distribution functions lie below the upper density bound 42 (wherever it is defined) and above the lower density bound 44 (wherever it is defined). Such a probability distribution will be called consistent with the probability assertion.

The density bound may be any function that maps a subset of a real line into a closed interval from 0.0 to 1.0 and that is monotone non-decreasing. The cumulative distribution function any probability density on this real line is a density bound, and any set of points $$\{<x_i, y_i>|i=1\ldots N\}$$

that satisfies $$0<=y_i<=1,$$

and $$i<j =>x_i<x_j \text{ and } y_i<y_j$$

is also a density bound.

Figure 5:
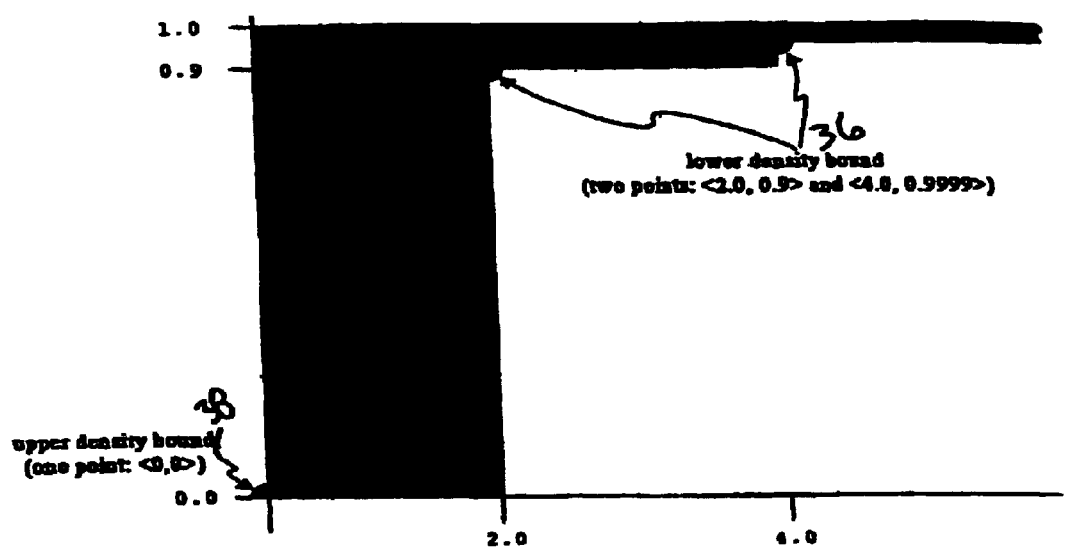
FIG. 5 is a graph showing both a continuous probability assertion and a discrete probability assertion shown relative to the other.

FIG. 5 further illustrates this point and shows that if an application is programmed to specify that a time, such as a latency, should be greater than 0 and less than 2 seconds 90% of the time, and less than 4 seconds 99.99% of the time, then the appropriate probability assertion is the probability assertion whose lower density bound defined by a set of two points: <2.0, 0.9> and <4.0, 0.9999>, and whose upper density bound is the single point <0,0>. We will call this probability assertion 'Latency PA'.

As another example, if an application wanted to specify that a count, such as the size in bytes of a message, should always be greater than or equal to 0 and less than or equal to 1024 and exactly equal to 1024 30% of the time, then the appropriate probability assertion consists of a lower density bound defined by a set of two points <1023, 0.7> and <1024, 1.0>, and an upper density bound defined by a set of two points: <-1, 0> and <1023, 0.7>.

When the probability assertion PA and an interval I is on a real line, the "maximum mass" of PA on I is the maximum mass that any probability density that is consistent with PA has on I. The interval I can be open, closed, half-open, half-closed, or infinite. For example, the maximum mass of LatencyPA on the interval 3.0<=t<=5.0 is 0.1. That is, any distribution of latencies that is consistent with Latency PA will have at most 10% of its latencies between 3 and 5 seconds. The maximum mass is computed simply by subtracting the value of the lower density bound at the left end of the interval from the value of the upper density bound at the right end of the interval.

Minimum mass is defined as one would expect. Given a probability assertion PA and an interval I in the real line, the "minimum mass" of PA on I is the minimum mass that any probability distribution that is consistent with PA has on I. The interval I can be open, closed, half-open, half-closed or infinite. For example, the minimum mass of Latency PA on the interval 0.0<=t<3.0 is 0.9. That is, any distribution of latencies that is consistent with LatencyPA will have at least 90% of its latencies between 0 and 3 seconds. The minimum mass is computed simply by subtracting the value of the upper density bound at the left end of the interval from the value of the lower density bound at the right end of the interval, and taking the maximum of that value and 0.

The "maximum mean" of PA is the maximum of the means of all probability distributions that are consistent with PA. If any probability distribution that is consistent with PA does not have a mean, then the maximum mean of PA does not exist; otherwise, if any probability distribution that is consistent with PA has an infinite mean, then the maximum mean of PA is also infinite. The maximum mean a probability assertion PA is computed as follows. If the lower density bound of PA is the CDF of a density that has a mean m, then the maximum mean of PA is m; otherwise the maximum mean is infinite or does not exist. For example, the maximum mean of LatencyPA is infinite, since a small proportion (0.01%) of the latencies are allowed to be arbitrarily great.

Minimum mean is also defined as one would expect. Given a probability assertion PA, the "minimum mean" of PA is the minimum of the means of all probability distributions that are consistent with PA. If any probability distribution that is consistent with PA does not have a mean, then the minimum mean of PA does not exist; otherwise, if any probability distribution that is consistent with PA has a negative infinite mean, then the minimum mean of PA is also negative infinity. The minimum mean of a probability assertion PA is computed as follows. If the upper density bound of PA is the CDF of a density that has a mean m, then the maximum mean of PA is m; otherwise the maximum mean is negative infinity or does not exist. For example, the minimum mean of LatencyPA is zero; further, a probability assertion for a "large PA" contains or encompasses another probability assertion "small PA" if every distribution that is consistent with "small PA" is also consistent with "large PA".

Having described the constructional features of the present invention, use of the invention related to transmitting messages over a network will be described in greater detail. Those skilled in the art will appreciate that the invention may be used by other devices without departing from the intended scope of the present invention. For illustrative purpose, suppose that the service provided by the interface and support software is messaging, and we want to enable the applications to specify Q of S properties before they are linked to the interface. Suppose also that the service in question uses UDP over an Ethernet Local Area Network (LAN). The protocol typically followed to link the application and support software is for the application to request a Q of S while also specifying a constraint on the load that it will impose. The support software associated with the LAN processes the request of the application and responds with a "granted" or "refused" indication. If the request is granted, then the application can send messages over the service, and it will be guaranteed to receive the agreed-upon Q of S provided that it does not exceed the agreed-upon load.

Without limitation, for this example, the Q of S consists only of two values, a latency for message delivery, and a reliability. The application specifies the latency as a continuous probability assertion, and the reliability is specified as a single number that is a lower bound on the proportion of sent messages that are successfully delivered. Load will also be specified as two values: the distribution of message sizes, which is a discrete probability assertion, and the inter-service-request-times, which is a continuous probability assertion.

Assuming that the probability that a message given by a support application to a network interface card for transmission will ultimately be successfully delivered to the message's destination network interface card is equal to the combined availability of the network and the interface cards, and that value is 0.9999, and if the total load on the LAN is less than 25 megabits per second (Mbps), then 99.8% of all messages will be successfully delivered with a latency of no more than 3*N microseconds where N is the number of 1024-byte packets needed to hold the message. Those skilled in the art will appreciate that the probability assertion should also account for the effect of transient peaks in load and not just the long-term average load. Similarly, the probability assertion should also take into account that the successful delivery is not independent of all other attempts to deliver messages.

To further illustrate the use of probability assertions by an application linked to a network, suppose that the support software interface gets a request from an application to support messaging with a specified load and Q of S, as detailed above. If that Q of S requires a reliability of more than 0.9999, then the request must be refused. Whether the latency condition in the Q of S specification can be satisfied is more difficult to determine.

Assuming, for example, that the load specified in the service request contains a distribution of message sizes in bytes SizePA, which is a discrete probability assertion, and a distribution of inter-service-request-times in seconds TimePA, which is a continuous probability assertion. We can calculate a bit-rate for this load as follows: let ms be the maximum mean of SizePA, and let mt be the minimum mean of TimePA. Let br be ms*8/mt; hence br is the maximum average number of bits per second that the application could present for transmission.

Assume, in addition, that the support software had previously agreed to provide messaging services over this LAN with specified loads that consist of distributions of message sizes in bytes $SizePA_i$, which are discrete probability assertions, and distributions of inter-service-request-times $TimePA_i$, which are continuous probability assertions, for i=1, . . . , N. For each of these N loads we can calculate a maximum average number of bit per second, $br_i$, as above.

Then if the sum of $br+br_1+ \ldots +br_N$ exceeds 25 Mbps, and if the support software accepted the latest request from the application, the total load on the LAN would fall outside the limit, and nothing could be predicted about latency over the LAN. In this case, the support software would have to refuse to undertake the requested service. (There is one exception: if all QoSs being requested are empty—that is, all the applications will accept any latencies (often called "best effort")—then the support software can undertake the requested service even in these conditions.)

Otherwise, the sum of $br+br_1+ \ldots +br_N$ is less than 25 Mpbs, and the LAN can be predicted to have the properties specified above. Now from the distribution of message sizes SizePA, we can derive a probability assertion on the distribution of the number of 1024-byte packets needed to hold the messages. (e.g., if 90% of the messages are less than 1024 bytes long, then 90% of the messages require at most one 1024-byte packet.) From this distribution, and the Ethernet property than an N-packet message is transmitted with a latency of 3*N microseconds 99.8% of the time, we can derive a probability assertion on message latencies. (e.g., if 90% of the messages take at most one 102-byte packet, then 90*0.998% of the messages have a latency of at most 3 microseconds.) Finally, if this distribution of latencies is contained within the distribution of latencies specified by the application, then the support software can grant the applications' request for service.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself

What is claimed is:

1. A system for determining whether an interface is capable of fulfilling a quality of service demand of an application, said system comprising:

an interface capable of both linking to applications and performing services for said applications; and application, including a demand specifier that defines a required quality of service to be performed by said interface, wherein a capability of said interface to perform said required quality of service is determined by said interface upon initializing a negotiation link between said interface and said application; and wherein the demand specifier does not depend upon system requirements of said interface.

2. The system as recited in claim 1, wherein the demand specifier does not depend upon a medium linking said interface and said applications.

3. The system as recited in claim 1, wherein said demand specifier includes a probability assertion.

4. The system as recited in claim 3, wherein said probability assertion is defined by a pair of density bounds.

5. The system as recited in claim 4, wherein the pair of density bounds determine the maximum acceptable latency between requesting a service and performance of the service.

6. The system as recited in claim 4, wherein the pair of density bounds are dependent upon a predefined minimum reliability of the link between said interface and said applications.

7. The system as recited in claim 4, wherein the pair of density bounds are dependent upon a predefined required security of said link.

8. The system as recited in claim 1, wherein the demand specifier is dependent upon a predefined maximum acceptable latency between requesting a service and performance of the service.

9. The system as recited in claim 1, wherein the demand specifier is dependent upon a predefined minimum reliability of the link between said interface and said applications.

10. The system as recited in claim 1, wherein the demand specifier is dependent upon a predefined required security of said link.

11. The system as recited in claim 1, wherein said interface includes a network of microprocessor based controllers.

12. The system as recited in claim 1, wherein said interface includes a network of microprocessor based controllers and said applications includes a remote microprocessor based computer linked to said interface.

13. A system for determining whether an interface is capable of fulfilling a quality of service demand of an application, said system comprising:

an interface capable of both linking to a plurality of applications and performing services for said applications; and applications including a probability assertion that defines a required quality of service to be performed by said interface, wherein a capability of said interface to perform said required quality of service is determined by said interface upon initializing a negotiation link between said interface and said application; and wherein the probability assertion does not depend upon system requirements of said interface.

14. The system as recited in claim 13, wherein the probability assertion does not depend upon a medium linking said interface and said applications.

15. The system as recited in claim 13, wherein the probability assertion is dependent upon a predefined maximum acceptable latency between requesting a service and performance of the service.

16. The system as recited in claim 13, wherein the probability assertion defines a minimum reliability of the link between said interface and said applications.

17. The system as recited in claim 13, wherein the probability assertion defines a required security of said link.

18. The system as recited in claim 13, wherein said interface includes a network of microprocessor based controllers.

19. The system as recited in claim 13, wherein said interface includes a network of microprocessor based controllers and said applications includes a remote microprocessor based computer linked to said interface.

20. The system as recited in claim 13, wherein said probability assertion is defined by a pair of density bounds.

21. The system as recited in claim 20, wherein the pair of density bounds are dependent upon a predefined maximum acceptable latency between requesting a service and performance of the service.

22. The system as recited in claim 20, wherein the pair of density bounds are dependent upon a predefined minimum reliability of the link between said interface and said applications.

23. The system as recited in claim 20, wherein the pair of density bounds are dependent upon a predefined required security of said link.

24. A system for determining whether an interface is capable of fulfilling a quality of service demand of an application, said system comprising:

control means for processing requested services, said control means capable of both linking to a plurality of applications and performing services for said applications; and applications including demand means for defining a required quality of service to be performed by said control means, wherein a capability of said control means to perform said required quality of service is determined by said control means upon initializing negotiation a link between said control means and said demand means; and wherein the demand means does not depend upon system requirements of said control means.

25. The system as recited in claim 24, wherein the demand means is dependent upon a predefined maximum acceptable latency between requesting a service and performance of the service.

26. The system as recited in claim 24, wherein the demand means is dependent upon a predefined minimum reliability of the link between said demand means and said control means.

27. The system as recited in claim 24, wherein the demand means is dependent upon a predefined required security of said link.

28. The system as recited in claim 24, wherein said control means includes a network of microprocessor based controllers.

29. The system as recited in claim 24, wherein said control means includes a network of microprocessor based controllers and said demand means includes a remote microprocessor based computer linked to said control means.

30. A method for determining whether an interface is capable of fulfilling a quality of service demand of an application, said method comprising steps of:

(a) including in an application a demand specifier that defines a required quality of service and level of load for communication to be performed by an interface;

(b) linking the interface to said application for negotiation;

(c) determining whether the interface is capable of performing the required quality of service of said application upon initializing said link for negotiation between said interface and said application, wherein the demand specifier does not depend upon system requirements of said interface;

(d) if the interface is not capable of performing the required quality of service, optionally modifying the required quality of service of said application and repeating step (c);

(e) if the interface is not capable of performing the required duality of service, optionally modifying level of load and repeating step (c);

(f) terminating the link between the interface and application without communication if the interface is not capable of performing the quality of service required by the application; and (g) allowing communication to proceed between the interface and the application if the interface is capable of performing the quality of service required by the application.

31. The method according to claim 30, wherein the demand specifier does not depend upon a medium linking said interface and said applications.

32. The method according to claim 30, wherein said demand specifier includes a probability assertion.

33. The method according to claim 30, further including the step of setting the demand specifier dependent upon a predefined maximum acceptable latency between requesting a service and performance of the service.

34. The method according to claim 30, further including the step of setting the demand specifier dependent upon a predefined minimum reliability of the link between said interface and said applications.

35. The method according to claim 30, further including the step of setting the demand specifier dependent upon a predefined required security of said link.

36. The method according to claim 30, wherein said interface includes a network of microprocessor based controllers.

37. The method according to claim 30, wherein said interface includes a network of microprocessor based controllers and said applications includes a remote microprocessor based computer linked to said interface.

* * * * *

UNITED STATES PATENT AND TRADEMARK OFFICE
CERTIFICATE OF CORRECTION

PATENT NO. : 6,810,422 B1
DATED : October 26, 2004
INVENTOR(S) : Joseph K. Cross It is certified that error appears in the above-identified patent and that said Letters Patent is hereby corrected as shown below:

Column 12,
Line 4, delete "duality" and insert -- quality --.

Signed and Sealed this

First Day of February, 2005

JON W. DUDAS
*Director of the United States Patent and Trademark Office*